United States Patent [19]

Offermans

[11] 4,194,793
[45] Mar. 25, 1980

[54] TELESCOPING GUIDE RAIL CONSTRUCTION

[75] Inventor: Hubert G. Offermans, Bunde, Netherlands

[73] Assignee: Thomas Regout N.V., Netherlands

[21] Appl. No.: 829,877

[22] Filed: Sep. 1, 1977

[30] Foreign Application Priority Data

Sep. 9, 1976 [NL] Netherlands .................. 7610020

[51] Int. Cl.² ........................................... F16C 21/00
[52] U.S. Cl. ........................................ 308/3.8; 16/88;
308/6 R; 312/341 R
[58] Field of Search ................... 308/3.6, 3.8, 6 R;
312/341 R, 347; 16/88

[56] References Cited

U.S. PATENT DOCUMENTS

| 2,261,504 | 11/1941 | Saunders | 308/3.8 |
| 2,320,276 | 5/1943 | Gussack | 308/6 R |
| 2,606,090 | 8/1952 | Straubel | 308/3.8 |
| 3,157,441 | 11/1964 | Pickles | 308/3.8 |
| 3,588,198 | 6/1971 | Stewart et al. | 308/3.8 |
| 3,650,578 | 3/1972 | Del Vecchio et al. | 308/3.8 |

Primary Examiner—Charles E. Frankfort
Attorney, Agent, or Firm—Morgan, Finnegan, Pine, Foley & Lee

[57] ABSTRACT

A telescoping guide rail construction comprising a plurality of telescoping rails, generally U-shaped in cross-section, and balls between the rails running in concave ball races formed by integral mouldings of adjacent rails. At least one of the integral mouldings is formed by a portion of a flange bent over at the end of a leg of one of the rails and bent back at least substantially into contact with the leg concerned. In order to resist deformative effects from the rolling action of the balls on their races in use, the free end of the curved-back portion of the flange is bent back towards the leg concerned to form a terminal edge bearing with its extremity on the leg in the vicinity of the base thereof.

4 Claims, 1 Drawing Figure

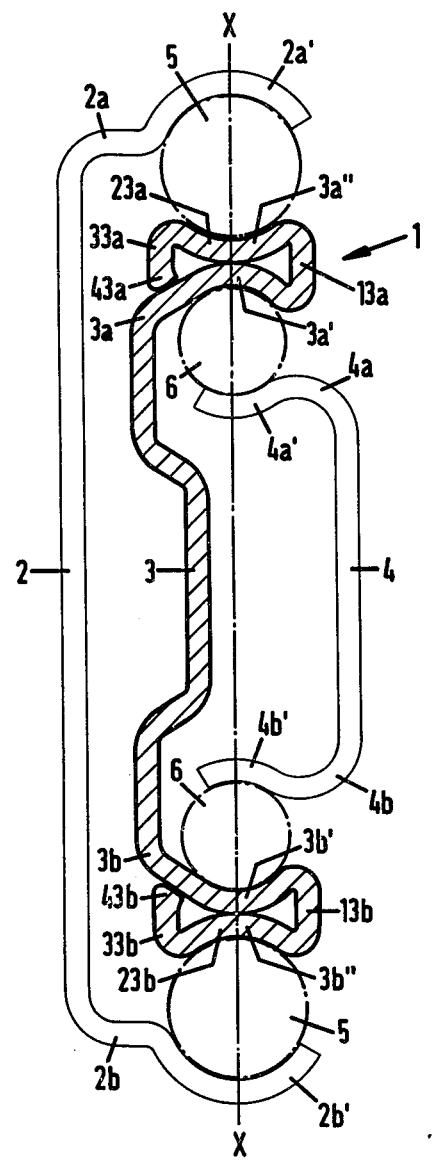

TELESCOPING GUIDE RAIL CONSTRUCTION

This invention relates to a telescoping guide rail construction, comprising a plurality of telescoping rails, substantially U-shaped in cross-section, and balls between said rails running in integral mouldings on said rails, which integral mouldings are concave each to the other, and at least one of which is formed by a portion of a flange bent over at the end of a leg of one of the rails and bent back at least substantially into contact with the leg concerned.

In such guide rail constructions, which are used on a large scale for drawers, for example, great forces are required to be taken up with relatively modestly dimensioned integral mouldings. For when the rail construction is in its farthest extended position the load moment is high and must then be capable of being transmitted between the two rail mouldings by the balls, which are located relatively closely together in the direction of extension of the drawer. This leads to high, concentrated loads, via the balls, on the moulded portions of the rails designed for guiding said balls. During pushing-in and drawing-out movements under such load, a deformative rolling action will be exerted on the ball races at the relevant ends of the rail mouldings between which the balls are then confined. In time this action is apt to be productive of undesirable deformations of the mouldings at the rail ends and slightly further towards the middle of the rail. This may result in malfunctioning of, and damage to, the guide rail construction, and even render it completely useless. In this connection it should be noted that users will often exercise additional, undesirable vertical forces on extended drawers, which increase the effect of deformation and in particular rolling-out of the moulded portions of the rails forming the ball races.

It is an object of the present invention, while retaining advantageous, keen dimensions for the integral mouldings, to avoid by simple means the objectionable deformation and rolling-out effects experienced during use of prior constructions in the loaded state.

According to the invention, there is provided a telescoping guide rail construction comprising a plurality of telescoping rails, substantially U-shaped in cross-section, and balls between said rails running in integral mouldings on said rails, which integral mouldings are pairwise concave to each other, and at least one of which is formed by a portion of a flange bent over at the end of a leg of one of the rails and bent back at least substantially into contact with the leg concerned, characterized in that, in section, the free end of said curved-back portion is bent back to form a terminal edge bearing with its extremity on said leg in the vicinity of the base thereof.

By virtue of the terminal edge formed on the flange beyond the concave moulding functioning as a ball race, the concave moulding can no longer be flattened in the direction towards the reverse side of the U-leg concerned, as has been of frequent occurrence in practice with flanges without such a terminal edge under the load conditions outlined above. As a result, the concave moulding reliably retains its contemplated concave form adapted to the balls, so that a considerable reinforcement is obtained with a minimum amount of additional material, determined by the said terminal edge, which is extremely short in cross-section.

With a view to providing the most effective support for the end of the terminal edge against the outside of the U-leg concerned in the vicinity of the base of the leg, a preferred feature of the present invention is that the terminal edge is bent over to extend substantially parallel to an imaginary plane containing the base lines of the two legs of the rail concerned.

The cross-sectional configuration commonly used for such rails has a pronounced transition between the web and the legs of the U along the two edges of the web, that is to say, in the corner zone there is a right angle, or at most a slightly obtuse angle, between web and leg in cross-section. The effect of the feature just referred to, i.e., that the terminal edge is substantially parallel to the imaginary plane containing the base lines of the two legs of the U, is that the end of the terminal edge is firmly supported against the outside of the leg in the area immediately adjacent to the base of that leg.

In a further elaboration of the principle of the present invention, the said terminal edge is thickened towards its extremity relatively to the thickness of the flange on which it is formed. This feature provides additional support for the end of the terminal edge against the leg and still further enhances the resistance of the concave integral moulding of the flange, while yet allowing for the use of relatively thin material for the rail.

One embodiment of the present invention will now be described, by way of example, with reference to the accompanying drawing.

In said drawing, there is shown in a single FIGURE a cross-sectional and diagrammatic view of a telescoping guide rail construction according to the present invention, showing an intermediate rail section between two further U-section rails, i.e., an innermost rail and an outermost rail, with balls between adjacent rails.

It should be noted, however, that the present invention is not intended to be limited to the embodiment shown in the drawing and to be described hereinafter. On the contrary, many variations and modification can be made within the framework of this invention. In particular, the application of the invention is not limited to telescoping guide rail constructions consisting of three successive rail sections, but other numbers are equally possible. Also, the additional flange-terminal edge proposed according to the invention can of course be applied to more than one of the rail sections.

Referring now to the drawing, there is shown a telescoping guide rail construction generally indicated at 1. In the present case, the construction consists of three rails 2, 3 and 4 each of substantially U-shaped cross-sectional configuration, and telescoping relatively to each other in a direction normal to the plane of drawing. Disposed between the respective rails are outer balls 5 and inner balls 6, spaced along the length of the rails. They are maintained in selected spaced positions relative to each other by known per se cages, which may be formed as U-section members, the legs of each of which extend between the legs of a respective rail section, with the balls extending into openings in said legs. These U-section members are not shown in the drawing.

Balls 5 and 6 run in integral mouldings formed in the legs of rail sections 2, 3 and 4, and this at the concave side thereof. In the outermost rail 2, the integral mouldings are formed at the end of legs 2a, 2b, and designated by reference numerals 2a' and 2b', and in the innermost rail 4 they are formed in legs 4a, 4b, and designated by reference numerals 4a' and 4b'.

The central rail section 3 has two such integral mouldings at each leg 3a and 3b. Mouldings 3a' and 3b' are formed in the actual legs of the section, and mouldings 3a" and 3b" are each formed by a portion of a flange, formed at the end of each leg 3a and 3b. These flanges consists of three successive portions, viz. a first portion 13a, 13b extending outwardly from the end of leg 3a, 3b, respectively, a portion 23a, 23b bent over at the end of the first portion 13a, 13b, respectively, and curved back with its convex rear surface into contact with the outer surface of mouldings 3a' and 3b', respectively, and finally a terminal edge 33a, 33b, bent back at the end of portion 23a, 23b, respectively, towards leg 3a, 3b, respectively, so that its extremity 43a, 43b, is supported against the rear surface of leg 3a, 3b, respectively, in the vicinity of the base of said leg 3a, 3b, respectively. Portions 23a and 23b of the flanges constitute the integral mouldings forming outer races for balls 5 on rail section 3, and mouldings 3a', 3b' of rail section 3 form inner races for balls 6.

Terminal edges 33a and 33b are of increasing thickness, in cross-section, towards their respective extremities 43a and 43b, as a consequence of which they are firmly seated on legs 3a, 3b, to provide vigorous support for the concave races formed by portions 23a and 23b. Owing to the support so realized, the inclination of the parts of concave races 23a and 23b shown to the left of axis X—X through the centres of the balls cannot be flattened under the influence the rolling loads acting substantially parallel to axis X—X, as has been found to be the case in telescoping guide rail construction lacking terminal edges 33a and 33b.

In this connection it should be borne in mind that, although the loads to be taken up are in the main parallel to axis X—X, not inconsiderable transverse forces, additionally enhancing the deformative effect on races 23a and 23b, are liable to occur especially in the farthest extended position of such telescoping guide rail constructions, in particular when applied for drawers and the like.

As shown in the drawing, terminal edges 33a and 33b extend substantially parallel to axis X—X, i.e. parallel to the imaginary plane containing the "bases" of legs 3a and 3b, i.e. the lines according to which these legs connect to the web of rail section 3.

I claim:

1. A telescoping guide rail construction comprising a plurality of telescoping rails, substantially U-shaped in cross-section, at least one of said telescoping rails having a leg, and balls between said rails running in integral moldings on said rails, which integral moldings are pairwise concave to each other, and at least one of which integral moldings is formed by a portion of a flange which is bent over to form a bent over portion at the end of said leg of said at least one of said telescoping rails and is curved back at least substantially into contact with said bent over portion of said leg of said at least one of said telescoping rails to form a curved back portion, wherein, in section, said curved-back portion has a free end which is bent back to provide a terminal edge having an extremity which is seated on said bent over portion of said leg of said at least one of said telescoping rails to provide support for one of which integral moldings.

2. A telescoping guide rail construction according to claim 1, wherein said terminal edge extends substantially parallel to an imaginary plane containing the bases of the two legs of the rail concerned.

3. A telescoping guide rail construction according to claim 1, wherein said terminal edge is thickened towards it extremity relative to the thickness of the flange of which it is formed.

4. A telescoping guide rail construction comprising
a plurality of telescoping rails generally U-shaped in cross-section and having a web portion and two legs;
concave ball races formed on the legs of said rails;
and a plurality of balls disposed to run on said ball races; at least one leg of one rail having a first flange portion extending away from the opening of the U; a second flange portion extending from a first end to said first flange portion substantially at right angles to, and towards, said web portion with a concavity forming a ball race on one surface of said second flange portion and convexity on the reverse surface of said second flange portion, at least substantially in contact with said one leg; and a third flange portion extending from a terminal end of said second flange portion of said one leg in abutting relationship thereto at a position adjacent to a base of said one leg and being adapted to be seated on said one concave ball race formed on said one leg to provide support for said second flange portion.

* * * * *